UNITED STATES PATENT OFFICE.

ARTHUR T. MALM, OF WORCESTER, MASSACHUSETTS, ASSIGNOR TO NORTON COMPANY, OF WORCESTER, MASSACHUSETTS, A CORPORATION OF MASSACHUSETTS.

GLAZED REFRACTORY ARTICLE.

1,081,542.  Specification of Letters Patent.  Patented Dec. 16, 1913.

No Drawing.  Application filed May 29, 1912.  Serial No. 700,468.

*To all whom it may concern:*

Be it known that I, ARTHUR T. MALM, a citizen of the United States, residing at Worcester, in the county of Worcester and State of Massachusetts, have invented certain new and useful Improvements in Glazed Refractory Articles, of which the following is a specification.

This invention relates to glazed refractory articles having a base of previously molten alumina, the object of the invention being to provide a crucible or other article of this character which will withstand temperatures to or above a white heat, while possessing a far higher thermal conductivity than porcelain. Such articles are also more durable than the best porcelain under all conditions of use.

To manufacture articles of this character I prefer to proceed as follows: Calcined bauxite or other impure commercial form of alumina, or pure or purified alumina prepared by chemical methods, is fused in an electric furnace, and the product is crushed to grain and graded in the known manner as practised for the manufacture of abrasive articles. This product is hereinafter referred to as "alumina grain." The grains are preferably then roasted in an oxidizing atmosphere in order to eliminate traces of carbids or other reduction products which if present in the finished article might cause local disintegration or pitting of the body. The grain is then mixed with a small proportion, usually from five to fifteen per cent., or somewhat more, of a plastic clay, which serves as a bond, and sufficient water to produce a thin slip or body of suitable consistency to form the article. The slip is then applied, usually as a comparatively thin layer, to the surface of a highly porous or absorptive mold or form, which may be made of plaster of Paris. This mold or form together with the refractory coating is then dried at moderate temperatures, say about 50° C., after which the article may be separated from the mold, and will be found sufficiently strong to endure firing.

The molds or forms may be used an indefinite number of times. The firing is accomplished in kilns under standard conditions and at temperatures sufficiently high to fuse, vitrify or in some instances to partially vitrify the bond, as may be required by porosity or other characteristics desired in the body.

The resulting article is very refractory and possesses a high degree of porosity, being in both respects well-adapted to receive and retain a glaze. It is found however that the article has a relatively high coefficient of expansion at temperatures below a white heat, and it is necessary to use a glaze of which the coefficient of expansion so nearly approximates that of the refractory base that the glazed article may be carried through the entire range of temperatures below a white heat without checking, scaling or other injury to the glaze. A porcelainic glaze compounded as follows has however been found highly satisfactory:

| | | |
|---|---|---|
| Feldspar | 41.8 | per cent. |
| Flint | 27.3 | " " |
| Whiting ($CaCO_3$) | 17.7 | " " |
| Clay | 13.2 | " " |
| | 100.00 | |

A lead glaze compounded as follows may also be used:

| | | |
|---|---|---|
| Feldspar | 26.37 | per cent. |
| Whiting ($CaCo_3$) | 14.38 | " " |
| White lead | 12.37 | " " |
| Clay | 12.37 | " " |
| Flint | 34.51 | " " |
| | 100.00 | |

These compositions may be melted and the refractory article coated by dipping; or the coating may be applied in any approved manner. In the case of thin walled articles of high porosity the glaze may completely penetrate the wall, or it may be limited to the outer portions of the wall.

Crucibles and other articles prepared as above resemble glazed porcelain in appearance, but are far more serviceable and durable under conditions of use. Previously molten alumina has a thermal conductivity more than double that of porcelain, and this not only permits quicker and more economical heating through alumina walls than through walls of porcelain but very greatly reduces the strain set up in the walls during heating or cooling. However, the high thermic expansion of previously molten alumina renders it quite impossible to use ordinary pottery glazes with satisfactory results; and so far as I am aware it has never been possible, prior to my invention, to provide an article consisting essentially of previously molten alumina and a bond with a glazed surface capable of withstanding without injury rapidly succeeding extremes of temperature.

My invention is not limited to the specific glazing compositions above set forth, for the proportions of the several ingredients may be somewhat varied; and it is moreover possible that glazes may be otherwise compounded which will so closely approximate the thermal expansion of previously molten alumina as to render them suitable for use therewith.

Among the many articles which may be prepared in accordance with this invention may be mentioned crucibles for laboratory use or for the melting of metals; combustion tubes and boats; spark plugs; various forms of insulators for electrical purposes, etc. It will be understood that the article may be completely or only partially glazed, as its intended use may indicate.

I claim:

1. As a new article of manufacture, a crucible or other article consisting of a body portion comprising alumina grain and a ceramic bond, and a porcelainic glaze for said body portion, the coefficient expansion of said glaze closely approximating that of the body portion.

2. As a new article of manufacture, a crucible or other article consisting of a body portion comprising alumina grain and a ceramic bond, and a glaze for said body portion, the coefficient expansion of said glaze closely approximating that of the body portion.

In testimony whereof, I affix my signature in presence of two witnesses.

ARTHUR T. MALM.

Witnesses:
 CHAS. R. MILLER,
 H. O. ANDERSON.